United States Patent
Jones et al.

(10) Patent No.: US 6,826,191 B1
(45) Date of Patent: Nov. 30, 2004

(54) PACKETS CONTAINING TRANSACTION ATTRIBUTES

(75) Inventors: Andrew M. Jones, Redland (GB); John A. Carey, Bishopston (GB)

(73) Assignee: STMicroelectronics Ltd. (GB)

( * ) Notice: Subject to any disclaimer, the term of this patent is extended or adjusted under 35 U.S.C. 154(b) by 0 days.

(21) Appl. No.: 09/411,419

(22) Filed: Oct. 1, 1999

(51) Int. Cl.[7] .......................... H04L 12/28; H04L 12/56
(52) U.S. Cl. ....................... 370/401; 370/444; 370/455; 710/241
(58) Field of Search ................................ 370/387, 392, 370/400, 401, 402, 403, 422, 423, 444, 449, 451, 452, 455; 710/113–118, 240, 241, 244, 40–45

(56) References Cited

U.S. PATENT DOCUMENTS

| | | | |
|---|---|---|---|
| 4,719,621 A | * 1/1988 | May | 370/402 |
| 4,814,981 A | 3/1989 | Rubinfeld | 364/200 |
| 5,251,311 A | 10/1993 | Kasai | 395/425 |
| 5,386,565 A | 1/1995 | Tanaka et al. | 395/700 |
| 5,423,050 A | 6/1995 | Taylor et al. | 395/575 |
| 5,434,804 A | 7/1995 | Bock et al. | 364/579 |
| 5,440,705 A | 8/1995 | Wang et al. | 395/421.1 |
| 5,448,576 A | 9/1995 | Russell | 371/22.3 |
| 5,452,432 A | 9/1995 | Macachor | 395/425 |
| 5,455,936 A | 10/1995 | Maemura | 395/183.11 |
| 5,479,652 A | 12/1995 | Dreyer et al. | 395/183.06 |
| 5,483,518 A | 1/1996 | Whetsel | 370/13 |
| 5,488,688 A | 1/1996 | Gonzales et al. | 395/183.1 |
| 5,530,965 A | 6/1996 | Kawasaki et al. | 395/800 |
| 5,570,375 A | 10/1996 | Tsai et al. | 371/22.3 |
| 5,590,354 A | 12/1996 | Klapproth et al. | 395/800 |
| 5,592,628 A | 1/1997 | Ueno et al. | |
| 5,596,734 A | 1/1997 | Ferra | 395/825 |
| 5,598,551 A | 1/1997 | Barajas et al. | 395/484 |
| 5,608,881 A | 3/1997 | Masumura et al. | 395/306 |

(List continued on next page.)

FOREIGN PATENT DOCUMENTS

| | | | |
|---|---|---|---|
| EP | 0165600 B1 | 11/1991 | G06F/13/36 |
| EP | 0636976 B1 | 2/1995 | G06F/11/00 |
| EP | 0636976 A1 | 2/1995 | G06F/11/00 |
| EP | 0652516 A1 | 5/1995 | G06F/11/00 |
| EP | 0702239 A2 | 3/1996 | G01R/31/3173 |
| EP | 0720092 A1 | 7/1996 | G06F/11/00 |
| EP | 0840221 A1 | 6/1998 | |
| EP | 0933926 A1 | 8/1999 | H04N/5/00 |
| EP | 0945805 A1 | 9/1999 | G06F/12/08 |
| EP | 0959411 A1 | 11/1999 | G06F/13/24 |
| JP | PCT/JP96/02819 | 9/1996 | G06F/9/46 |
| JP | 8320796 A | 12/1996 | G06F/9/46 |
| JP | 8329687 A | 12/1996 | G11C/15/00 |
| JP | 9212358 A | 8/1997 | G06F/9/38 |
| JP | 9311786 A | 12/1997 | G06F/9/38 |
| JP | 10106269 A | 4/1998 | G06F/12/08 |
| JP | 10124484 A | 5/1998 | G06F/17/10 |
| JP | 10177520 A | 6/1998 | G06F/12/10 |

OTHER PUBLICATIONS

Richard York; Real Time Debug for System–on–Chip Devices; Jun. 1999; pp. 1–6.

(List continued on next page.)

*Primary Examiner*—Chau Nguyen
*Assistant Examiner*—Soon-Dong Hyun
(74) *Attorney, Agent, or Firm*—Lisa K. Jorgenson; William J. Kubida

(57) ABSTRACT

An integrated circuit comprising a plurality of functional modules and interconnected via a packet router for conveying request and response packets is described. Transactions involve the dispatch of request packets and receipt of corresponding response packets. Each packet conveys a number of transaction attributes which can control how the packet is managed by control circuitry which controls the flow of packets on the packet router. For example the transaction attributes can include a transaction number, a grouping indicator, a priority indicator and a post indicator.

8 Claims, 7 Drawing Sheets

U.S. PATENT DOCUMENTS

| | | | |
|---|---|---|---|
| 5,613,153 A | 3/1997 | Arimilli et al. | 395/821 |
| 5,627,842 A | 5/1997 | Brown et al. | 371/22.3 |
| 5,657,273 A | 8/1997 | Ayukawa et al. | 395/189.01 |
| 5,682,545 A | 10/1997 | Kawasaki et al. | 395/800 |
| 5,704,034 A | 12/1997 | Circello | 395/183.14 |
| 5,708,773 A | 1/1998 | Jeppesen, III et al. | 395/183.06 |
| 5,724,549 A | 3/1998 | Selgas et al. | 395/468 |
| 5,737,516 A | 4/1998 | Circello et al. | 395/183.14 |
| 5,751,621 A | 5/1998 | Arakawa | 364/748.07 |
| 5,768,152 A | 6/1998 | Battaline et al. | 364/551.01 |
| 5,771,240 A | 6/1998 | Tobin et al. | 371/22.1 |
| 5,774,701 A | 6/1998 | Matsui et al. | 395/556 |
| 5,778,237 A | 7/1998 | Yamamoto et al. | 395/750.04 |
| 5,781,558 A | 7/1998 | Inglis et al. | 371/21.1 |
| 5,796,978 A | 8/1998 | Yoshioka et al. | 395/416 |
| 5,828,825 A | 10/1998 | Eskandari et al. | 395/183.03 |
| 5,832,248 A | 11/1998 | Kishi et al. | 395/376 |
| 5,835,963 A | 11/1998 | Yoshioka et al. | 711/207 |
| 5,848,247 A | 12/1998 | Matsui et al. | 395/284 |
| 5,860,127 A | 1/1999 | Shimazaki et al. | 711/167 |
| 5,862,387 A | 1/1999 | Songer et al. | 395/728 |
| 5,867,726 A | 2/1999 | Ohsuga et al. | 395/800.32 |
| 5,884,092 A | 3/1999 | Kiuchi et al. | 395/800.35 |
| 5,896,550 A | 4/1999 | Wehunt et al. | 395/846 |
| 5,918,045 A | 6/1999 | Nishii et al. | 395/584 |
| 5,926,628 A * | 7/1999 | Tran et al. | 710/113 |
| 5,930,523 A | 7/1999 | Kawasaki et al. | 395/800.32 |
| 5,930,833 A | 7/1999 | Yoshioka et al. | 711/210 |
| 5,944,841 A | 8/1999 | Christie | 714/38 |
| 5,950,012 A | 9/1999 | Shiell et al. | 395/712 |
| 5,953,538 A | 9/1999 | Duncan et al. | 395/842 |
| 5,956,477 A | 9/1999 | Ranson et al. | 395/183.06 |
| 5,978,874 A | 11/1999 | Singhal et al. | 710/107 |
| 5,978,902 A | 11/1999 | Mann | 712/227 |
| 5,983,017 A | 11/1999 | Kemp et al. | 395/704 |
| 5,983,379 A | 11/1999 | Warren | 714/727 |
| 6,157,989 A * | 12/2000 | Collins et al. | 711/151 |
| 6,282,195 B1 * | 8/2001 | Miller et al. | 370/392 |
| 6,397,325 B1 * | 5/2002 | Jones et al. | 712/227 |
| 6,415,344 B1 * | 7/2002 | Jones et al. | 710/105 |
| 6,434,593 B1 * | 8/2002 | Mikata et al. | 709/200 |
| 6,449,670 B1 * | 9/2002 | Jones et al. | 710/100 |

OTHER PUBLICATIONS

Georgiou C. J. et al: An Experimental Coprocessor for Implementing Persistent Objects on an IBM 4381, ACM 0–89791–238–1/87/1000–0084,1987.

Guttag, Karl M.: TI's new MVP Chip Brings Parallel–processing Power to Multimedia Applications, Byte.

European Search Report, EP 00 30 8365, May 28, 2004.

* cited by examiner

PACKETS CONTAINING TRANSACTION ATTRIBUTES

FIELD OF THE INVENTION

The present invention relates to the transmission of packets which contain transaction attributes. The invention is particularly but not exclusively concerned with the transmission of packets in an integrated circuit comprising a plurality of functional modules interconnected via a packet router.

BACKGROUND TO THE INVENTION

Computer systems and integrated circuit processors exist which implement transactions with the dispatch and receipt of packets. Request packets define an operation to be performed and response packets indicate that a request has been received and whether or not the operation defined in a request packet has been successfully carried out. The integrated circuit processor can comprise a plurality of functional modules connected to a packet router for transmitting and receiving the request and response packets. Transactions involve the dispatch of request packets and receipt of corresponding response packets. Each request packet prompts the generation of an associated response packet which is returned to the indicator of the request.

Current routing systems rely on an arbitration mechanism which controls the flow of request and response packets over a packet router. This mechanism normally operates under the control of dedicated control signals from the functional modules, for example a request signal to request access to the packet router and a grant signal to grant access to the packet router. By increasing the number of dedicated control signals it is possible to increase the complexity of arbitration mechanisms, for example to take into account priority. Generally, the design process is such that the architecture of a processor is designed and the functional modules which are required are determined. Then, depending on the nature of the functional modules and the requirements which their nature impose on the packet router, a suitable arbitration mechanism is implemented with the necessary packet protocol and control signals to support that mechanism.

Generally, the control signals which control the arbitration apply globally across the packet router and are generated by the functional modules internal routing circuitry.

It is an aim of the present invention to provide a packet protocol which can be utilised across a number of different projects and designs, and in particular to allow for performance enhancements based on transaction information.

According to one aspect of the present invention there is provided an integrated circuit comprising: a plurality of functional modules interconnected via a packet router, each functional module having packet handling circuitry for generating and receiving packets conveyed by the packet router; wherein a first set of said functional modules act as initiator modules and have packet handling circuitry which includes request packet generation circuitry for generating request packets for implementing transactions, each request packet including a destination indicator identifying a destination of the packet and a transaction field holding a unique transaction number for each request packet and at least one transaction attribute, and wherein a second set of said functional modules act as target modules and each have packet handling circuitry which includes packet receiver logic for receiving said request packets and response packet generation logic for generating respective response packets, each response packet having a copy of the transaction field transmitted with the respective request packet; the integrated circuit further comprising routing control circuitry which is operable to read said at least one transaction attribute and to control the manner in which packets are conveyed by the packet router responsive to said at least one transaction attribute.

The unique transaction number uniquely identifies the transaction with which that request packet is associated. When such a request packet is received at a destination module, a response packet is generated which also identifies the unique transaction number. This allows responses and requests to be matched at the initiator module, for example to reorder received responses such that they are properly associated with their respective requests.

Thus, according to the present invention transaction attributes are associated with particular packets rather than with the system control. Thus, any systems which implement a distributed/hierarchical routing and arbitration system can utilise this information where it is important for system performance, and ignore it at points in the system where it is not. Because the transaction attributes are associated with the packets, they are always available.

Another aspect of the invention provides an initiator functional module for connection in an integrated circuit comprising: an interface for supplying and receiving packets to and from the functional module, said interface being connected to a port for connecting the functional module to a packet router; packet handling circuitry for handling said packets and including request packet generating logic which generates request packets for supply to the packet router via the interface, each request packet having a destination indicator identifying a destination of the packet and a transaction field which comprises a unique transaction number for each request packet and at least one transaction attribute for use by routing control of the integrated circuit in routing the transaction over the packet router.

A further aspect of the invention provides a target functional module for connection in an integrated circuit comprising: an interface for supplying and receiving packets to and from the functional module, said interface being connected to a port for connecting a functional module to a packet router; packet receiver logic which is operable to receive request packets supplied from the packet router via the interface to the target functional module, each request packet having a transaction field including a unique transaction number and at least one transaction attribute, wherein the target module further comprises packet receiver logic for generating respective response packets on receipt of each request packet, each response packet having a transaction field which holds a copy of the unique transaction number and said at least one transaction attribute conveyed by the respective request packet.

A further aspect of the invention provides a method of implementing transactions in an integrated circuit comprising a plurality of functional modules interconnected via a packet router, the method comprising: at one of said functional modules acting as an initiator module, generating a request packet including a destination indicator identifying a destination of the packet and a transaction field holding a unique transaction number and at least one transaction attribute associated with the transaction; reading the transaction attribute conveyed by the request packet and using the transaction attribute in an arbitration mechanism controlling the flow of packets on the packet router; at the destination indicated by the destination indicator, receiving said request packet and generating a response packet for transmission to the initiator functional module, said response packet holding a copy of the transaction field of the corresponding request packet.

A further aspect of the invention provides a method of implementing transactions in an integrated circuit comprising a plurality of functional modules interconnected via a packet router, the method comprising: at one of said functional modules acting as an initiator module, generating a request packet including a destination indicator identifying a destination of the packet and a transaction field holding a unique transaction number and a post indicator; detecting the post indicator at a local routing control unit and generating a response packet; at the destination indicated by the destination indicator, receiving said request packet and generating a further response packet with the post indicator set; and detecting receipt of the response packet at the local routing control unit and deleting said packet.

The transaction field can hold one or a plurality of transaction attributes.

A first transaction attribute acts as a grouping indicator to indicate to the routing control circuitry that the performance of the system would be enhanced if the packets with this indicator set are kept in an uninterrupted sequence.

Because the transaction field is copied over to respective response packets, the same transaction attribute is set in response packets of the linked or grouped memory access operations. This has a similar effect on the routing control circuitry.

Another transaction attribute acts as a priority indicator to indicate the priority of the transaction. The priority indicator can be used at the routing control circuitry to arbitrate transactions on the packet router.

Another transaction attribute acts as a post bit which, when set in a request packet, causes the routing control circuitry to generate a local response packet. When the request packet is received by the destination target module, a normal response packet with a copy of the transaction field is generated and in this case the routing control circuitry is operable responsive to setting of the post bit in the response packet to locally delete that response packet.

For a better understanding of the present invention and to show how the same may be carried into effect reference will now be made by way of example to the accompanying drawings.

DESCRIPTION OF THE PREFERRED EMBODIMENT

Figure 1:
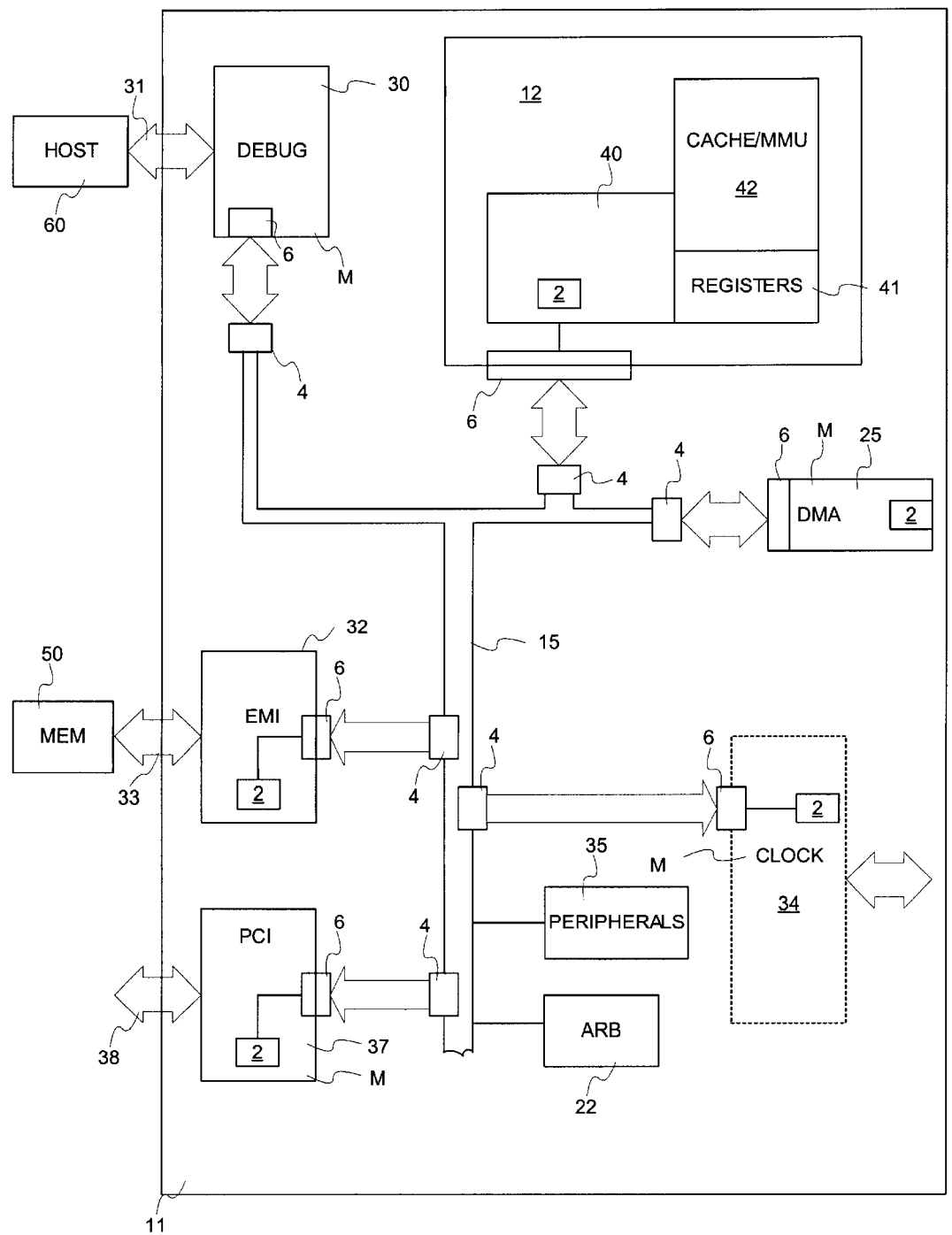
FIG. 1 is a block diagram of a processor embodied as an integrated circuit with an external memory.

FIG. 1 illustrates an integrated circuit according to an embodiment of the invention. On each chip 11 a CPU unit 12 is connected to a plurality of modules M by a data and address path 15 arranged to carry bit packets in parallel form. The modules as well as the CPU unit 12 each include packet handling circuitry 2 used in the generation and receipt of bit packets on the path 15. The path 15 is referred to herein as a packet router or routing bus. Two main types of packet are used on the data and address path 15, each including a destination indicator or address to indicate the required destination module connected to the path 15. The packets include request packets which are generated by an initiator module and response packets which are generated by a target module. A module may act as both an initiator and a target. Response packets are of two types, ordinary responses or error responses. These are discussed in more detail later. The modules M as well as the CPU unit 12 each have packet handling circuitry 2 for handling packet formation and receipt of requests, ordinary responses and error responses.

The routing bus 15 provides bi-directional connections to each module. In this example the bus consists of parallel request and response buses and a dedicated control bus provided respectively for each module so as to link the modules to an arbitration unit 22. Each module is connected to the routing bus via a port 4 and is provided with an interface 6 incorporating a state machine so as to interchange control signals and data between the port 4 and the interface 6.

Figure 1A:
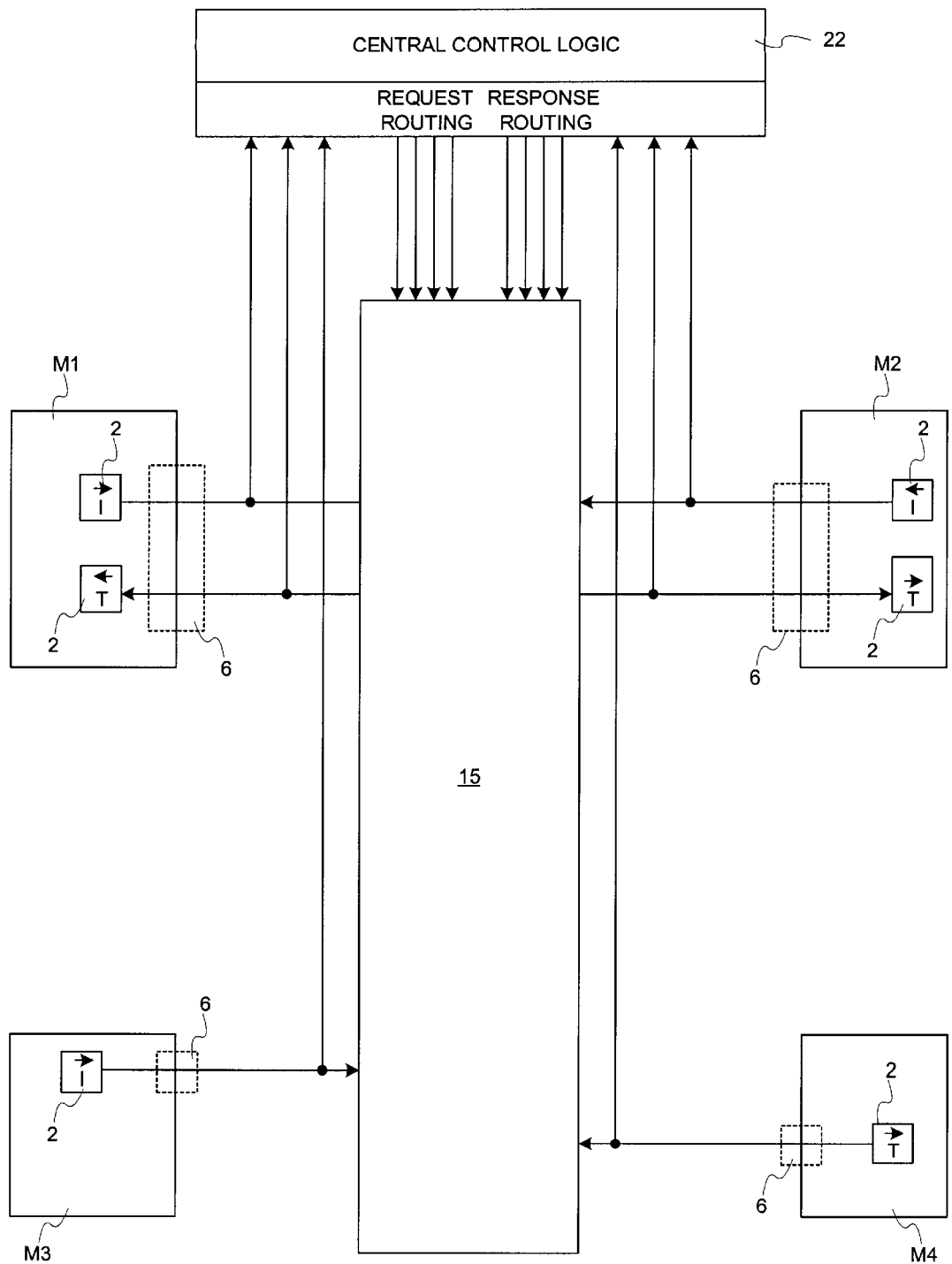
FIG. 1A is a block diagram illustrating initiator and target modules.

FIG. 1A is a block diagram illustrating relevant functional components of the chip of FIG. 1 to illustrate the concept of targets and initiator modules. The modules are labelled M1, M2, M3 and M4 and may include any of the modules M already described with reference to FIG. 1. Modules M1 and M2 both have target and initiator functions as illustrated by the separate target and initiator parts of the interface 6 of each module. Module M3 acts only as an initiator and module M4 acts only as a target. Signals from the interfaces 6 are supplied to central control logic which forms part of the arbitration unit 22. The arbitration unit 22 issues request routing controls and response routing controls to the routing bus network 15.

In the example shown in FIG. 1, the various modules 14 include a debug module 30 which includes an external link 31 for transmitting packets across the chip boundary, an external memory interface EMI 32 having an external bus connection 33 leading to an external memory 50, clock circuitry 34, various peripheral interfaces 35, a peripheral component interface PCI 37 with an external connection 38, a DMA unit 25 for effecting memory accesses as well as the arbitration unit 22. The CPU unit 12 includes a plurality of instruction execution units 40, a plurality of registers 41, and a cache 42. The CPU unit 12 also includes packet handling circuitry 2 connected to the execution units 40. The routing bus 15 is arranged to transmit to the modules M both request and response packets for effecting memory access transactions as discussed further herein. These packets may be generated by software as a result of instruction execution by a CPU or by hardware responsive to detection of a packet. Initiator modules can act autonomously to generate packets. The packets may be generated on-chip and distributed on the bus 15 or generated off-chip and supplied to the on-chip bus 15 through an external connection such as the link 31 associated with the debug module 30.

The CPU can be operated in a conventional manner receiving instructions from a program memory and effecting data read or write operations with the cache 42 on-chip. Additionally external memory accesses for read or write operations may be made through the external memory interface 32 and bus connection 33 to the external memory 50.

The debug module 30 provides an important external communication which may be used for example in debugging procedures. The on-chip CPU 12 may obtain instruction code (by memory access packets) for execution from an external source such as a debugging host 60 communicating through the link 31. Communications on the routing bus 15 are carried out in bit parallel format. It is possible to reduce the parallelism of packets obtained from the routing bus 15 so that they are output in bit serial format through the link 31.

Each packet is constructed from one or more cell or token, the end of the packet being identified by an end of packet (eop) signal. The construction of the cells is discussed in more detail later. Briefly, each packet cell comprises a number of fields which characterise the packet. Each packet is transmitted by a source module and is directed to a destination module. An initiator can issue request packets and act on response packets. A target can receive and act on requests and issue responses. Thus, a source module may be an initiator or a target depending on the nature of the packet. The source module uses its associated port 4 to transmit a packet onto the routing bus 15. The routing bus 15 arranges for the packet to be routed to the port associated with the destination module. The destination module then receives that packet from its associated port. The source and destination modules can be the same.

Figure 2:
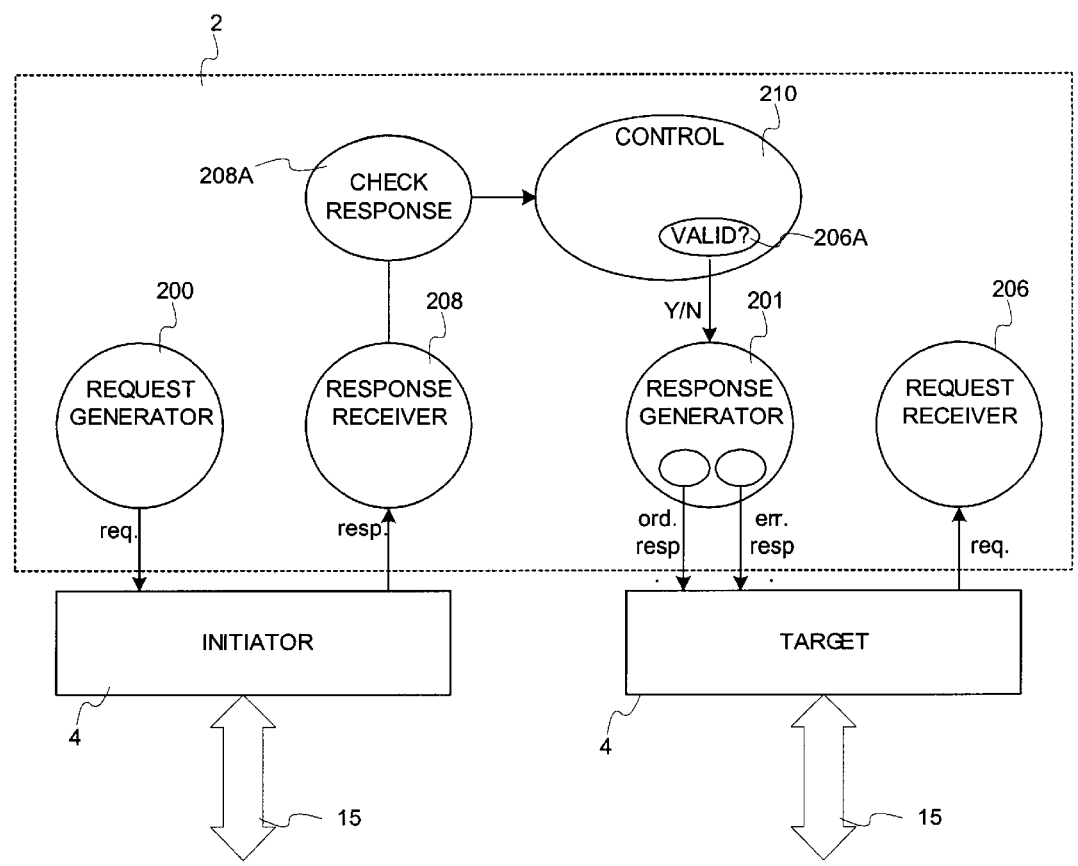
FIG. 2 shows the packet handling logic.

A transaction is an exchange of packets that allows a module to access the state of another module. A transaction consists of the transfer of a request packet from a source module to a destination module, followed by the transfer of a response packet from that destination module (now acting as a responding module) back to the source module which made the original request. The request packet initiates a transaction and its contents determine the access to be made. The response packet completes the transaction and its contents indicate the result of the access. A response packet also indicates whether the request was valid or not. If the request was valid, a so-called ordinary response packet is sent. If the request was invalid, an error response packet is transmitted. Some modules act only as initiators and thus their packet handling circuitry 2 is capable only of the generation of request packets. Some modules act only as targets, and therefore their packet handling circuitry 2 is capable only of generating response packets. In that case, both ordinary responses and error responses can be generated. However, some modules are capable of acting both as initiators or as targets, and their packet handling circuitry is capable of generating both request and response type packets. A logic diagram for the relevant parts of a module capable of both these functions is shown in FIG. 2. The packet handler 2 comprises request generator logic 200, ordinary response generator logic 202, error response generator logic 204, request packet receiver logic 206, and response packet receiver logic 208. These are all under the general functional control of a control logic block 210. A request packet is constructed by a requesting module when that module needs to make an access to a particular target module. As discussed more fully later, the address of the target module is recorded in the request packet destination field. The requesting module acts as a source of the request packet and sends that packet into the routing bus 15. The routing bus 15 arranges for that request packet to be routed from its source to its destination. The destination receives the request packet from the routing bus 15. The request packet receiver logic 206 checks whether or not the request is valid at 206a. If it is valid, an ordinary response packet is generated by the ordinary response generator logic 202 and the module services the requested access according to the information in the received request packet. If the request is not valid, the error response generator logic 204 generates an error response packet.

A response packet (ordinary or error) is constructed in order to reply to the request packet. The module which originated the request packet is recorded in the response packet's destination field. The responding module is the source of the response packet and sends that packet onto the routing bus 15. This is done by the module interface 6. The response receiver logic 208 receives the response packet from the routing bus 15 and checks the response at 208a. If the response can be matched to the original request, the transaction is completed.

Figure 3:
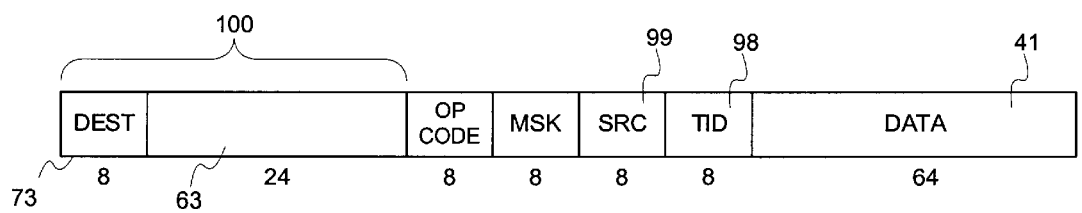
FIGS. 3 and 4 are packet formats of request and response packets respectively conveyed by the packet router.
Figure 4:
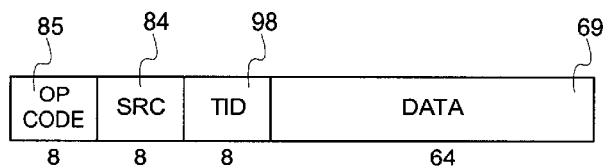

The format of the multibit packets used on the routing bus 15 in the microcomputer are illustrated by way of example in FIGS. 3 and 4. FIG. 3 shows the information carried by each request cell.

Each packet is constructed from a series of cells framed using an end of packet (eop) signal. Each request cell comprises a 32-bit address field which indicates the destination address of the packet. In the described embodiment, an address comprises an 8-bit destination field 73 followed by a 24-bit offset field 63 which identifies a memory location within the destination. The offset information is present in request packets to identify the particular memory location at which the request is targeted. The destination field 73 is a 1-byte field used to route the packet to the destination or target module. A byte 74 conveys the opcode which identifies the nature of the requested access. For example, the opcode can define a load word access for reading a register value and a store word access for writing a register value. A SRC byte 99 is a source field which identifies the source module and which is used as a return address for a response packet. A transaction field byte 98 conveys a unique transaction number which is used by the requester to associate responses with requests. The transaction number enables a module to identify response packets corresponding to respective request packets in cases where a plurality of request packets have been sent before response packets have been received for each request packet. As discussed in more detail later, the transaction field also holds transaction attributes describing the transaction to the system. A 64-bit data field 71 holds data to be conveyed with the request.

FIG. 4 illustrates the construction of a response packet cell. If the response packet contains more information than a single cell, it is constructed from a sequence of cells framed using a response end of packet (r_eop) signal. The response packet includes an opcode byte 85 which denotes the nature of the requested transaction, a byte 84 which identifies the source module of the requesting packet which gave rise to the response and which acts as the return address for the response packet, a transaction field byte 98 and a data field 69. The transaction field byte of a response packet holds a copy of the transaction field byte 98 of the corresponding request packet.

The opcode field 74 of a request packet has a number of different possible encodings to define the nature of the requested access. Bit 7 of the opcode is used to identify whether it is a request or a response packet however. With bit 7 set to one, the packet is a response and which bit 7 set to zero, the packet is a request. The opcode field 85 of the response packet thus has bit 7 set to one in each case. In addition, bit 0 is set to zero if the response is a ordinary response (successful transaction), and is set to one if it is an error response. Thus, the opcode field can quickly and readily identify whether a packet is a request or a response and whether the response is an ordinary response or an error response.

The function of the arbitration unit is to control packet flow on the packet router. In the described embodiment, the system guarantees to start all operations from a single source to a single memory location in the same order, to route all responses from a single source back to the same initiator and, in an order system, to return all responses back to a single source in the same order as requests were issued. The basic function of the arbitration unit follows below. It will readily be appreciated however that any suitable arbitration mechanism can be utilised with the transaction attributes discussed herein.

Figure 5:
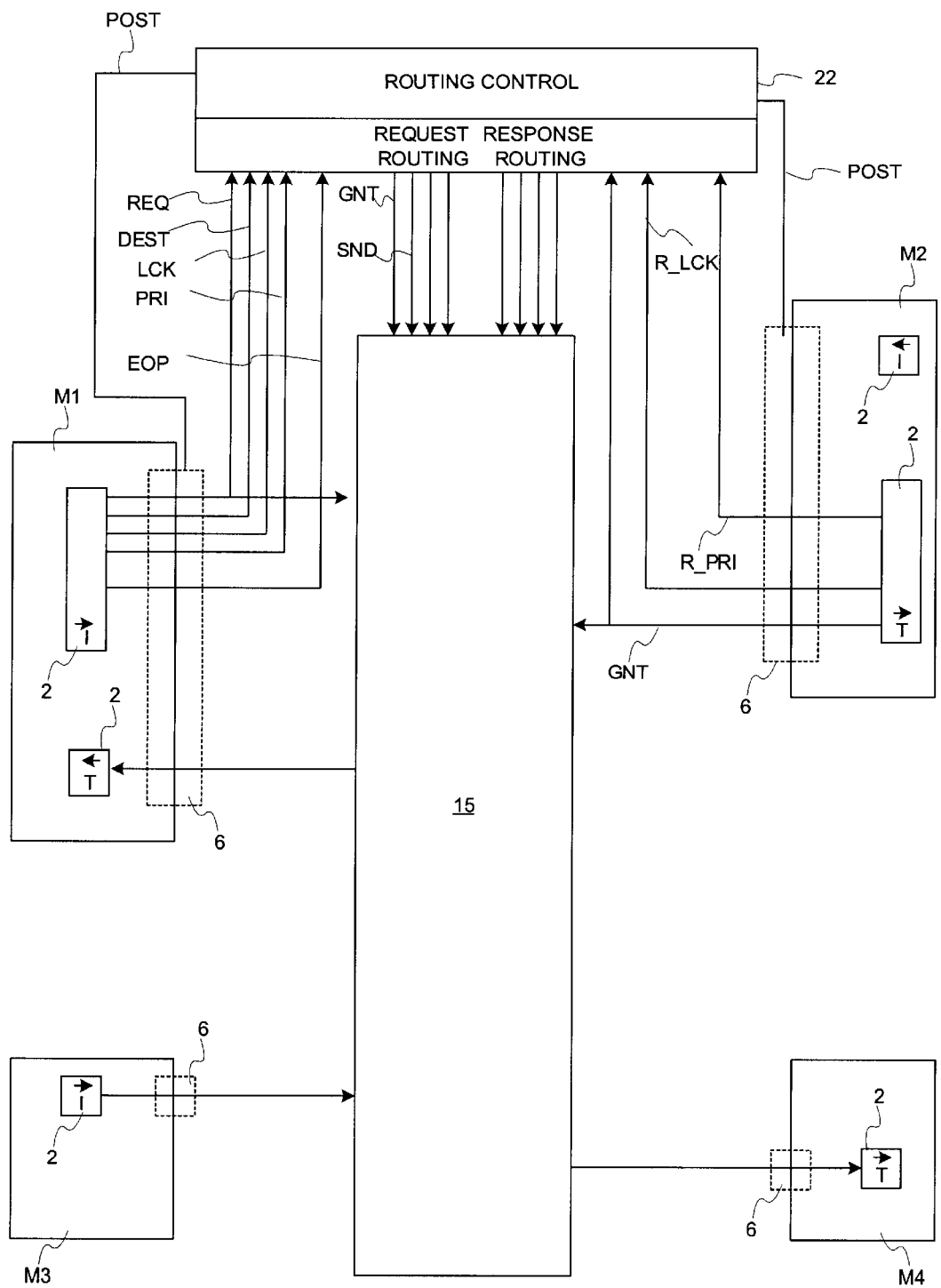
FIG. 5 is a block diagram more clearly illustrating the routing control signals.

When a module has a packet to send to another module, for example from the CPU unit 12 to the EMI module 32, it first signals this by asserting a request signal req to a dedicated line connecting that module to the central arbitration unit 22. Reference is made to FIG. 5 where M1 is the initiator module and M2 the target module. It also outputs an eight bit signal to indicate to the arbitration unit 22 the intended destination of the packet it wishes to transmit. A module M which is able to receive a packet from the routing bus 15 will assert a grant signal gnt to the central arbitration unit 22 regardless of whether a packet is available to be fed to that destination or not. When the central arbitration unit 22 determines that a module wishes to send a packet to a destination and independently the destination has indicated that it is able to receive a packet from the bus 15, the unit 22 arranges for the transfer to take place. The unit 22 asserts a "grant send" signal gnt_snd to the appropriate interface 6 causing the sending module to put the packet onto the bus 15. The arbitration unit 22 then asserts a "send" signal snd which signals to the receiving module that it should accept the transfers currently on the bus 15. The packet transmission concludes when the sender asserts an "end of packet" signal concurrently with the last transfer of packet data on the bus 15.

Although this description is made with reference to request packets, a similar arbitration mechanism applies for response packets. FIG. 5 also illustrates signals derived from the transaction attributes which are used in routing control and arbitration. These are discussed later.

Figure 6:
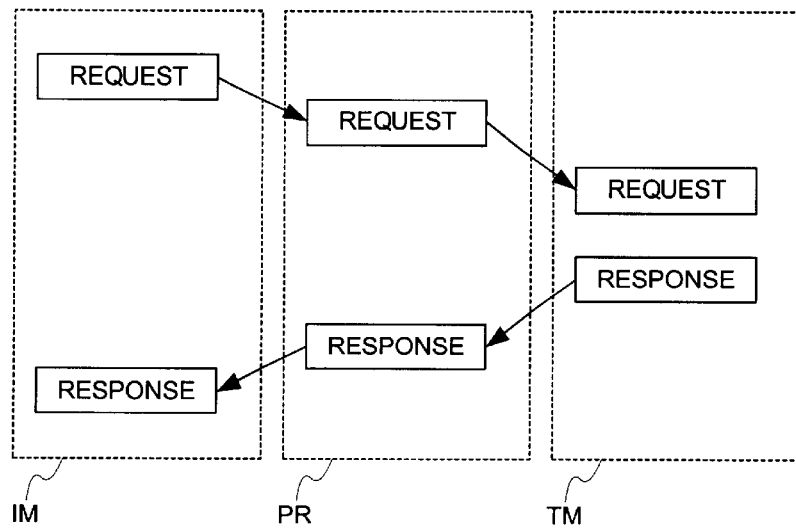
FIG. 6 illustrates a primitive memory access operation.

In order to better understand the functions of the indicators to be described in the following which are held in the transaction field 98, reference is made to FIG. 6 to describe a complete transaction. In FIG. 6, IM denotes an initiator module, TM denote a target module and PR denotes the packet router or routing bus 15.

A transaction is initiated by forming a request packet at the initiator module. The request packet is placed onto the packet router 15 by the initiator port associated with the initiator module IM and is conveyed by the packet router 15 to the target module defined in the destination field of the request packet. The memory access operation requested in the request packet is implemented and a response packet is formulated by the target module, placed on the packet router via the port associated with the target module and returned to the initiator module. Only then is a transaction deemed to be completed. FIG. 6 illustrates a so-called primitive transaction made up of a single request and response. Each request packet carries a unique transaction indicator which identifies that transaction by a number generated by the initiator module. This will be termed herein the transaction number. When the response packet is formulated at the target module TM, it contains the same transaction number as that conveyed by the request packet. Thus, when the response packet is received at the initiator module, the transaction number conveyed by the response can be matched to the transaction number of the initial request to confirm that the transaction has been completed. Each request packet generated by a particular initiator module has a unique transaction number.

Figure 7:
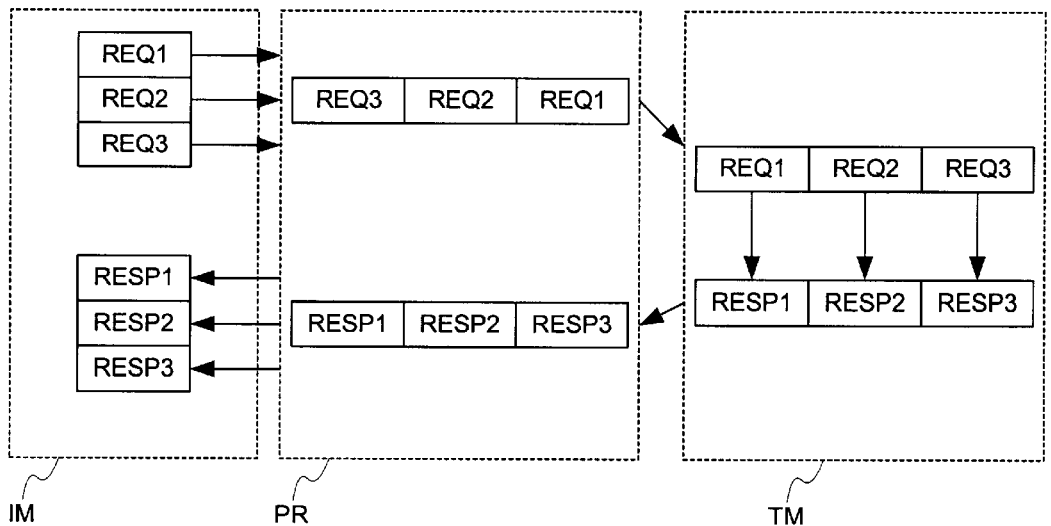
FIG. 7 illustrates a compound memory access operation.

The system described herein also supports so-called compound transactions. A compound transaction involves multiple request/response packets from a single module. This is illustrated diagrammatically in FIG. 7. It is assumed for the purposes of the example of FIG. 7 that this particular compound transaction involves the issuance of three request packet REQ1, REQ2, REQ3 by the initiator module. These request packets are transmitted via the packet router 15 to the target module. By using the lock signal described later, the arbitration module 22 controls the packet flow across the packet router to ensure that all three request packets are conveyed from the initiator module to the target module without interruption. As each request packet reaches the target module, a respective response packet REP1, REP2, REP3 is generated and conveyed by the packet router 15 to the initiator module. Each of the request packets REQ1, REQ2, REQ3 in the same compound transaction shares the same transaction number which is returned in the associated response packets. The fact that the transaction is a compound transaction can be conveyed in the opcode of the request packets. In this case, the arbitration unit 22 is caused to ensure that the initiator module remains locked until the complete compound transaction has been finished.

Another form of transaction is a so-called linked or grouped transaction. In this case, a TMI (transaction message information) bit in the transaction identifier field indicates that performance of the system may be enhanced if packets in which this attribute is set are treated preferentially by the arbitration unit 22. For example, in the case of a round-robin arbiter which rotates after each access, it could indicate to the arbitration unit that the next member packet in the linked group should be allowed access to the packet router. Thus, if the TMI bit is set to zero, this indicates that the transaction has no relationship with the next transaction (end of message) or, when the bit is set to one, it indicates that the next transaction is related to this transaction (part of a message). The packet protocol described herein allows for the existence of this TMI bit which may be utilised by the arbitration unit 22 as described to enforce the grouping as the system performance requirements demand it. However, if the system performance does not require it, the bit can simply be ignored without impacting the arbitration performance.

A good example of use of the TMI bit is where a plurality of accesses are to be made to the same page in memory via the EMI interface 32. By linking these accesses, the EMI interface can more efficiently utilise its resources to access the page rather than treating each access as a new access.

The TMI bit is included in both the request and response packets and therefore may be used to enhance the transaction performance of one or both phases.

Figure 8:
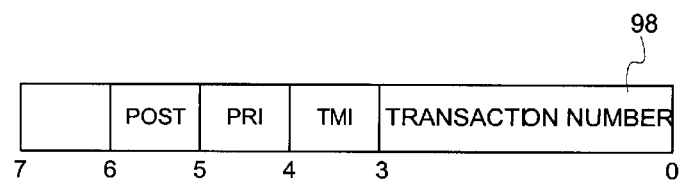
FIG. 8 illustrates the construction of the transaction field.

FIG. 8 is a diagram illustrating the bit encoding of the transaction identification field 98 illustrated in FIGS. 3 and 4. Note that the same enhancements are available in both the request and response packets. It is the same in both request and response packets. A response packet contains a copy of the request packet transaction field. In addition to the four bit transaction number at bits 0 to 3 and the TMI bit at bit 4, the transaction identifier field includes a priority bit PRI and a post bit POST. The function of these bits will be described later with reference to the routing control mechanism.

Figure 9:
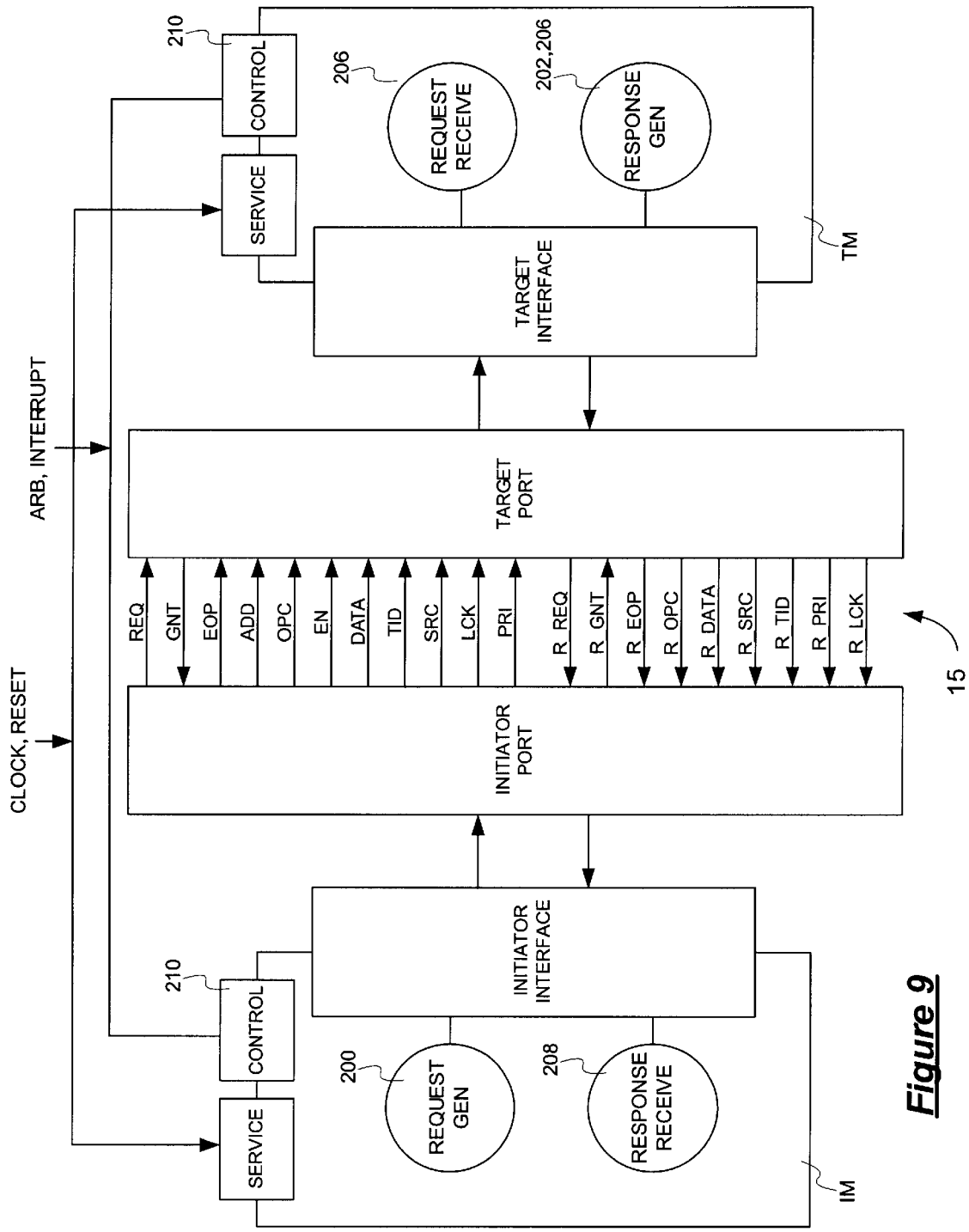
FIG. 9 is a block diagram illustrating the interface signals of functional modules.

FIG. 9 illustrates the signals which are supplied between the interfaces of respective initiator and target modules and their associated ports 4. In the diagram of FIG. 9, each line conveyed between the interface 6 and its respective port 4 is marked with a signal name. These signal names are used in the following to denote the signals carried by appropriate wires, without reference numerals for the sake of clarity of the diagram of FIG. 9. The same signal names are used in FIG. 5. Some of the signals are generated by control logic in the module, while other signals are generated from fields in the packets which are formed by the packet handling circuitry of each module. Thus, the initiator module includes control logic 210, request generator logic 200 and response receiver logic 208. The target module also includes control logic 210 and further includes request receiver logic 206 and a response generator which is labelled 202,204. Thus, the ordinary response generator logic and the error response generator logic illustrated in FIG. 2 have been combined into one block for the purposes of explanation of FIG. 9.

In the initiator module, the control logic 210 generates request req and end of packet eop signals. The request generator logic formulates a request packet as described earlier which causes the following signals to be generated:

address, add opcode, opc mask, en (short for byte enable)

data, transaction identifier, tid (including transaction number, post, TMI)

source identifier, src lock, lck and priority, pri.

In addition, the initiator module receives the following signals. A response end of packet signal r_eop is received by the control logic 210 as is the grant signal gnt. The response receiver logic 208 receives the following response packet signals r_opc, r_data, r_src, r_tid, r_pri and r_lck. The grant signal gnt, the response end of packet signal r_eop are generated by the control block 210. The remaining signals are formulated from the packet which is generated by the response generator.

The function of these signals and how they are derived from the packet fields is discussed below.

request (req) ready to send data

This is driven by an initiator module IM and is used to indicate that it is ready to transfer a request or element of a request across the interface. If this signal is asserted the request content and framing signals are valid.

Initiators indicate they have data to send by asserting request and expect a grant in this or subsequent cycles to complete the transfer.

grant (gnt) ready to accept data

This is driven by a target module TM and is used by the target to indicate it is ready to accept data. A data or cell transfer across the interface occurs when the initiator is ready to send and the target is ready to accept. i.e. both request and grant are asserted at a rising clock edge.

Targets indicate they are able to accept data by asserting grant and expect a request in this or subsequent cycles to complete the transfer.

end of packet (eop) final cell of packet

This driven by the initiator and indicates this is the final cell of a request packet.

lock (lck) transaction lock

This indicates to the system that this transaction is made up or more than one request/response pairs. It acts as a general mechanism to link two or more request packets to make a linked compound operation. Depending on the implementation of the system the lock signal can be derived from the opcode. As illustrated in FIG. 5, the lock signal is supplied by the initiator to the arbitration unit 22.

address (add) the transaction target address

This is the address of the target module, and the location within the target module the operation will occur on.

opcode (opc) the operation associated with the transaction

This defines the transaction operation. It is not generally interpreted by the interconnect or transport medium. The opcode information remains constant across all request cells associated with the transaction.

Compound operations may be built from multiple request/response packets linked via the lock mechanism.

mask (en) defines the bytes within the cell on which the target should complete the operation mask<0> is associated with data<7:0>, and so forth to the most significant byte.

data defines the data being carried with the cell

The data field is made up of a set of byte quantities, each byte being associated uniquely with a specific mask bit. Each byte is organised as a bit little endian quantity. The data field may contain multiple bytes, these are organised in a byte significant manner.

Data quantities larger than the natural bus width are always send using incrementing addresses, with the address wrapping at the $2^n$ boundary associated with that data quantity.

source (src) source identifier

This identifies the source of the transactions to the system. It allows the system (and target modules) to associate a series of transactions with a specific source of data.

identifier (tid) this includes the transaction number, post and TMI bits

The transaction number allows each transaction to be uniquely labelled. The transaction number of a request is used in the associated response.

priority (pri) this defines the transaction priority

This bit labels the transaction with an urgency level which the system interconnect may use to implement preferential arbitration and/or overtaking. It is used only to implement system performance enhancements. It is implemented in both the request packet and its associated response packet.

response request (r_req) this indicates a response cell is available

An initiator should only commence a transfer if it is ready to accept the response packet.

response grant (r_gnt) this indicates a response cell may be accepted response lock (r_gnt) transaction lock This indicates to the system that this transaction is made up or more than one request/response pairs. It acts as a general mechanism to link two or more response packets to make a compound operation.

response opcode (r_opc) information about the response being presented to the initiator That is, whether the operation was successful (ordinary response) or an error arose (error response).

response data (r_data) this defines the data being carried with the response cell A response packet will contain as many response cells as it required to build a response packet to transfer the number of words required by the transaction.

response source (r_src) a copy of the source identification field response identifier (r_tid) a copy of the transaction number These fields allow the response cell packet to be identified within a system enabling performance optimization and observability of transactions within the system. The encoding of these fields corresponds to that of the associated request fields.

response priority (r_pri) this defines the transaction priority

This field labels the response information with an urgency level which the system interconnect may use to implement preferential arbitration. This is a copy of the priority bit of the request packet.

It will be appreciated from the above that some of the signals generated across the routing bus 15 by the initiator and target modules IM, TM are supplied to the arbitration unit 22 to implement control of packet flow on the bus 15. Other signals are supplied directly from the initiator module to the destination target module. They have no function in the routing control itself.

In particular, the dest, request, grant, end of packet, lock and priority signals on both the request and response sides are utilised by the arbitration unit 22 to control packet flow. The remaining signals are not required for arbitration and are therefore routed directly from an initiator module to the destination target module. The transaction field 98 contains information of both kinds. The transaction number uniquely identifies a transaction to allow request and response packets to be matched at the initiator module. The transaction number is copied from a request packet to a response packet for this purpose.

The TMI bit of a transaction field can be used to advise the arbitration unit that performance will be improved if all of the request packets in a linked group can be transmitted in uninterrupted fashion across the routing bus 15. The TMI bit in a request packet is copied into the respective response packet so that the responses can be similarly treated.

The priority bit PRI likewise is derived from the transaction field and is used to control the priority with which the particular transaction is routed. Once again, the priority bit is copied from the transaction field of the request packet into the transaction field of the response packet.

The transaction field 98 also includes a post bit POST which is used by routing control which may be present in the arbitration unit 22 or elsewhere in the system to create a local response packet when a request packet having the post bit set is received. When the request packet reaches its final destination target module, the post bit is copied into the transaction field of the appropriate response packet and when this is detected by the routing control the response packet is deleted because the routing control knows that a response packet has already been generated.

For the sake of completeness, there follows the memory access operations supported by the system:

Load M Bytes

Definition

Transfer a single aligned word of m bytes from the target to the initiator.

Valid sizes for m are defined to be $2^n$ were n is an integer in the range 0–6.

Qualifiers

| | |
|---|---|
| address<31:n> | the address of the word to be accessed |
| address<n−1:0> | the address of the most critical byte within the word. This ensures the system will return the critical byte as part of the first cell in the response packet. |
| mask<$2^n$−1:0> | the mask indicates which bytes with the word are significant |
| r_data<$8 \times 2^n$−1:0> | data to be transferred, the significance of bytes within this field is inferred from the mask information |
| r_opcode | result of operation |

Store M Bytes

Definition

Transfer a single aligned word of m bytes from the initiator to the target, overwriting the location at that address with the data transferred.

Valid sizes for m are defined to be $2^n$ where n is an integer in the range 0–6.

Qualifiers

| | |
|---|---|
| address<31:n> | the address of the word to be accessed |
| address<n−1:0> | the address of the most critical byte within the word |
| mask<$2^n$−1:0> | the mask indicates which bytes with the word are significant |
| data<$8 \times 2^n$−1:0> | data to be transferred |

RmodW M Bytes

Definition

Transfer the value of the aligned word of m bytes from the target to the initiator, leaving the target device "locked" until a second transfer from the initiator to the target completes, replacing the information held at that address in the target device.

Valid sizes for m are defined to be $2^n$ where n is an integer in the range 0–6.

Qualifiers

| | |
|---|---|
| address<31:n> | the address of the word to be accessed |
| address<n−1:0> | the address of the most critical bytes within the word |
| mask<$2^n$−1:0> | the mask indicates which bytes with the word are significant |
| data<$8 \times 2^n$−1:0>: | data to be transferred from the initiator to the target |
| r_data<$8 \times 2^n$−1:0> | data to be transferred from the target to the initiator |

Swap M Bytes

Definition

Exchange the value of the single aligned word of m bytes from the initiator with the data held in the target location, returning the original target data to the initiator.

Valid sizes for m are defined to be $2^n$ where n is an integer in the range 0–6.
Qualifiers

| | |
|---|---|
| address<31:n> | the address of the word to be accessed |
| address<n–1:0> | the address of the most critical byte within the word |
| mask<2^n–1:0> | the mask indicates which bytes with the word are significant |
| data<8×2^n–1:0> | data to be transferred from the initiator to the target |
| r_data<8×2^n–1:0>: | data to be transferred from the target to initiator |

Load a Group of Words of M bytes: Load Group
Definition

Transfer a group of single aligned words of m bytes from the target to the initiator.

The group consists of a number of elements, each of which contains m bytes, valid values for m are $2^n$ where n is an integer in the range 0–6.
Qualifiers

| | |
|---|---|
| g*address<31:n>: | the address of the word to be accessed |
| g*address<n–1:0> | the address of the most critical byte with the word |
| g*mask<2^n–1:0> | the mask indicates which bytes within each word are significant |
| g*r_data<8×2^n–1:0> | data to be transferred, the significance of bytes within this field is inferred from the mask information |

The group contains g*m bytes of data, and is complete when eop is asserted on the final cell of the final word to be transferred.

The operation is a mechanism for the initiator to force the system to maintain a series of possibly unrelated operations as a single element.

Store a Group of Words of M Bytes: Store Group
Definition

Transfer a group of single aligned words of size m bytes from the initiator to the target, overwriting the information at that address with the data transferred.

The group consists of a number of elements, each of which contains m bytes, valid values for m are $2^n$ where n is an integer in the range 0–6.
Qualifiers

| | |
|---|---|
| g*address<31:n> | the address of the word to be accessed |
| g*address<n–1:0> | the address of the most critical byte within the word |
| g*mask<2^n–1:0> | the mask indicates which bytes with the word are significant |
| g*r_data<8×2^n–1:0> | data to be transferred |

The group contains g*m bytes of data, and is complete when eop is asserted on the final cell of the final word to be transferred.

This operation is a mechanism for the initiator to force the system to maintain a series of possibly unrelated operations as a single element.

What is claimed is:

1. An integrated circuit comprising:

a plurality of functional modules interconnected via a packet router, each functional module having packet handling circuitry for generating and receiving packets conveyed by the packet router;

wherein a first set of said functional modules act as initiator modules and have packet handling circuitry which includes request packet generation circuitry for generating request packets for implementing transactions, each request packet including a destination indicator identifying a destination of the packet and a transaction field holding a unique transaction number for each request packet and at least one transaction attribute, and wherein a second set of said functional modules act as target modules and each have packet handling circuitry which includes packet receiver logic for receiving said request packets and response packet, generation logic for generating respective response packets, each response packet having a copy of the transaction field transmitted with the respective request packet;

the integrated circuit further comprising routing control circuitry which is operable to read said at least one transaction attribute and to control the manner in which packets are conveyed by the packet router responsive to said at least one transaction attribute, wherein said at least one transaction attribute indicates the priority of the transaction, the routing control circuitry being operable to utilize this priority to arbitrate transactions on the packet router.

2. An integrated circuit according to claim 1, wherein the transaction attribute comprises a grouping indicator.

3. An integrated circuit comprising:

a plurality of functional modules interconnected via a packet router, each functional module having packet handling circuitry for generating and receiving packets conveyed by the packet router;

wherein a first set of said functional modules act as initiator modules and have packet handling circuitry which includes request packet generation circuitry for generating request packets for implementing transactions, each request packet including a destination indicator identifying a destination of the packet and a transaction field holding a unique transaction number for each request packet and at least one transaction attribute, and wherein a second set of said functional modules act as target modules and each have packet handling circuitry which includes packet receiver logic for receiving said request packets and response packet generation logic for generating respective response packets, each response packet having a copy of the transaction field transmitted with the respective request packet;

the integrated circuit further comprising routing control circuitry which is operable to read said at least one transaction attribute and to control the manner in which packets are conveyed by the packet router responsive to said at least one transaction attribute;

wherein said at least one transaction attribute comprises a post bit which, when set in a request packet, causes the routing control circuitry to generate a local response packet.

4. An integrated circuit according to claim 3, wherein the routing control circuitry is operable responsive to setting of the post bit in a response packet to locally delete that response packet.

5. An initiator functional module for connection in an integrated circuit having routing control circuitry controlling the manner in which packets in the integrated circuit are conveyed, comprising:

an interface for supplying and receiving packets to and from the functional module, said interface being connected to a port for connecting the functional module to a packet router;

packet handling circuitry for handling said packets and including request packet generating logic which generates request packets for supply to the packet router via the interface, each request packet having a destination indicator identifying a destination of the packet and a transaction field which comprises a unique transaction number for each request packet and at least one transaction attribute for use by the routing control circuitry of the integrated circuit in routing the transaction over the packet router, wherein the at least on transaction attribute indicates priority of the transaction whereby the routing control circuitry is operable to utilize the transaction priority to arbitrate transactions on the packet router.

6. A target functional module for connection in an integrated circuit having routing control circuitry controlling the manner in which packets in the integrated circuit are conveyed, comprising:

an interface for supplying and receiving packets to and from the functional module, said interface being connected to a port for connecting a functional module to a packet router;

packet receiver logic which is operable to receive request packets supplied from the packet router via the interface to the target functional module, each request packet having a transaction field including a unique transaction number and at least one transaction attribute, wherein the target module further comprises packet receiver logic for generating respective response packets on receipt of each request packet, each response packet heaving a transaction field which holds a copy of the unique transaction number and said at least one transaction attribute conveyed by the respective request packet, wherein the at least on transaction attribute indicates priority of the transaction whereby the routing control circuitry is operable to utilize the transaction priority to arbitrate transactions on the packet router.

7. A method of implementing transactions in an integrated circuit comprising a plurality of functional modules interconnected via a packet router, the method comprising:

at one of said functional modules acting as an initiator module, generating a request packet including a destination indicator identifying a destination of the packet and a transaction field holding a unique transaction number and at least one transaction attribute associated with the transaction, wherein said at least one transaction attribute indicates the priority of the transaction;

reading the transaction attribute conveyed by the request packet and using the transaction attribute in an arbitration mechanism controlling the flow of packets on the packet router;

at the destination indicated by the destination indicator, receiving said request packet and generating a response packet for transmission to the initiator functional module, said response packet holding a copy of the transaction field of the corresponding request packet.

8. A method of implementing transactions in an integrated circuit comprising a plurality of functional modules interconnected via a packet router, the method comprising:

at one of said functional modules acting as an initiator module, generating a request packet including a destination indicator identifying a destination of the packet and a transaction field holding a unique transaction number and a post indicator;

detecting the post indicator at a local routing control unit and generating a response packet;

at the destination indicated by the destination indicator, receiving said request packet and generating a further response packet with the post indicator set; and detecting receipt of the response packet at the local routing control unit and deleting said packet.

* * * * *